(12) United States Patent
Cogar, Sr. et al.

(10) Patent No.: US 6,800,106 B2
(45) Date of Patent: Oct. 5, 2004

(54) THERMOCHROMIC FILTER APPARATUS FOR COMPUTER

(76) Inventors: William K. Cogar, Sr., 43144 State Rte. 124, Racine, OH (US) 45771; Loretta I. VanCooney, 323 Harvard Ave., Elyria, OH (US) 44035

( * ) Notice: Subject to any disclaimer, the term of this patent is extended or adjusted under 35 U.S.C. 154(b) by 0 days.

(21) Appl. No.: 10/374,806

(22) Filed: Feb. 25, 2003

(65) Prior Publication Data

US 2004/0163367 A1 Aug. 26, 2004

(51) Int. Cl.[7] .......................... B01D 29/05; B01D 46/10
(52) U.S. Cl. ..................... 55/385.6; 55/490; 55/528; 96/17; 96/26; 96/417; 96/420
(58) Field of Search .............. 55/385.1, 385.6, 55/490, 511, 527, 528; 96/17, 26, 416, 417, 420; 361/684–688

(56) References Cited

U.S. PATENT DOCUMENTS

| | | | | |
|---|---|---|---|---|
| 3,635,001 A | * | 1/1972 | Komroff et al. | ............... 96/417 |
| 3,841,484 A | * | 10/1974 | Domnick | ...................... 210/95 |
| 3,971,877 A | | 7/1976 | Lee | |
| 4,889,542 A | | 12/1989 | Hayes | |
| 5,122,918 A | | 6/1992 | Chao | |
| 5,268,245 A | * | 12/1993 | Chiulli | ............................ 430/7 |
| 5,433,764 A | | 7/1995 | Matschke | |
| 5,600,090 A | | 2/1997 | Morris | |
| 5,772,713 A | | 6/1998 | Salinas et al. | |
| 5,827,340 A | | 10/1998 | Fiske | |
| 5,919,404 A | * | 7/1999 | Fujita et al. | ................. 252/583 |
| 6,110,260 A | * | 8/2000 | Kubokawa | ...................... 96/26 |
| 6,200,129 B1 | | 3/2001 | Sullivan et al. | |
| 6,214,070 B1 | * | 4/2001 | Crowder et al. | ............... 55/320 |
| 6,297,950 B1 | | 10/2001 | Erwin | |
| 6,310,770 B1 | * | 10/2001 | Negishi | ....................... 361/695 |
| 6,318,020 B1 | | 11/2001 | Mefferd | |
| 6,368,757 B1 | * | 4/2002 | Choi | .............................. 430/7 |
| 6,398,830 B1 | * | 6/2002 | Rhodes et al. | ............. 55/385.1 |
| 6,419,729 B1 | | 7/2002 | Duffy et al. | |
| 6,475,269 B1 | * | 11/2002 | Turner | .......................... 96/134 |
| 6,497,756 B1 | * | 12/2002 | Curado et al. | ............. 96/117.5 |
| 6,500,555 B1 | * | 12/2002 | Khaldi | ........................ 428/457 |
| 6,537,347 B2 | * | 3/2003 | Motouji et al. | ................... 95/8 |
| 6,716,266 B2 | * | 4/2004 | McNaughton | ............... 55/495 |
| 2002/0066372 A1 | * | 6/2002 | White | .......................... 96/424 |
| 2003/0226338 A1 | * | 12/2003 | Yair et al. | .................. 55/385.6 |
| 2004/0011202 A1 | * | 1/2004 | Kiilunen | ....................... 95/273 |

* cited by examiner

Primary Examiner—Robert H. Spitzer
(74) Attorney, Agent, or Firm—Dale J. Ream

(57) ABSTRACT

A filter apparatus includes a filter panel having inner and outer surfaces and a configuration for completely covering a computer housing ventilation opening. The filter apparatus includes an adhesive layer permanently adhered to the inner surface of the filter panel. A thermochromic region is positioned on the outer surface of the filter panel which changes color as temperature increases. The thermochromic region includes an ink layer and a wax layer positioned atop the ink layer. The wax layer includes a thermochromic dye having a color different from the color of the ink layer. The color of the thermochromic dye blocks the color of the ink layer at an ambient temperature and is transparent to allow the ink layer color to be seen at an activation temperature. Therefore, the filter apparatus provides an indication when the filter is full and heat is building within the housing as a result.

18 Claims, 3 Drawing Sheets

THERMOCHROMIC FILTER APPARATUS FOR COMPUTER

BACKGROUND OF THE INVENTION

This invention relates generally to computer filters and, more particularly, to a filter apparatus for use with computers for filtering dust from the air and for thermochromically indicating when the filter needs to be replaced.

Modern computers include advanced electronics packaged in relatively small housings and, therefore, generate significant amounts of heat. These electronic devices utilize active cooling systems such as fans in order to dissipate excessive heat that could cause failure of the electronics. A clean environment improves the overall performance of electronics in that dirt and dust inhibit speed and efficiency of computer chip performance.

Various devices have been proposed for filtering and preventing dust from entering an electronic environment. Although assumably effective for their intended purposes, the existing devices do not filter incoming or outgoing air while simultaneously providing a visual indicator of when the filter needs to be replaced.

Therefore, it is desirable to have a filter apparatus that includes a permanently charged electrostatic filter for drawing dust to its plurality of fibers. Further, it is desirable to have a filter apparatus having a thermochromic region that visually changes colors as temperature increases thereabout, an increase in temperature being an indication that electronic components are operating at a higher temperature due to an unclean environment.

SUMMARY OF THE INVENTION

A filter apparatus according to the present invention is for use with a computer of a type having heat generating electronic components positioned within a computer housing. The filter apparatus includes a permanently charged electrostatic filter panel that attracts dust thereto. The filter panel is configured to completely cover an air intake opening of the computer housing. The filter panel also includes an adhesive layer adhered to an inner surface of the filter panel for removably adhering the filter panel to the computer housing so as to cover the housing intake opening. A liner may be lightly adhered to the adhesive layer and removed prior to applying the filter panel to a computer housing. An outer surface of the filter panel includes a thermochromic region. This region includes an ink layer having a first color and a leucodye layer positioned atop the ink layer. The leucodye layer includes wax having a thermochromic dye therein, the dye including a color different from the first color so as to block the first color at a normal ambient temperature. When the leucodye layer is subjected to a predetermined activation temperature, the wax and dye melt to form a transparent ink that allows the first color to be seen. When a user sees the first color, he knows that the filter apparatus needs to be replaced.

Therefore, a general object of this invention is to provide a filter apparatus for filtering air flowing into and out of a computer housing.

Another object of this invention is to provide a filter apparatus, as aforesaid, having a thermochromic region which changes color when the filter needs to be replaced due to increased heat within the computer housing.

Still another object of this invention is to provide a filter apparatus, as aforesaid, which decreases the risk of electronic component failure within a computer by thermochromically detecting increases in heat.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
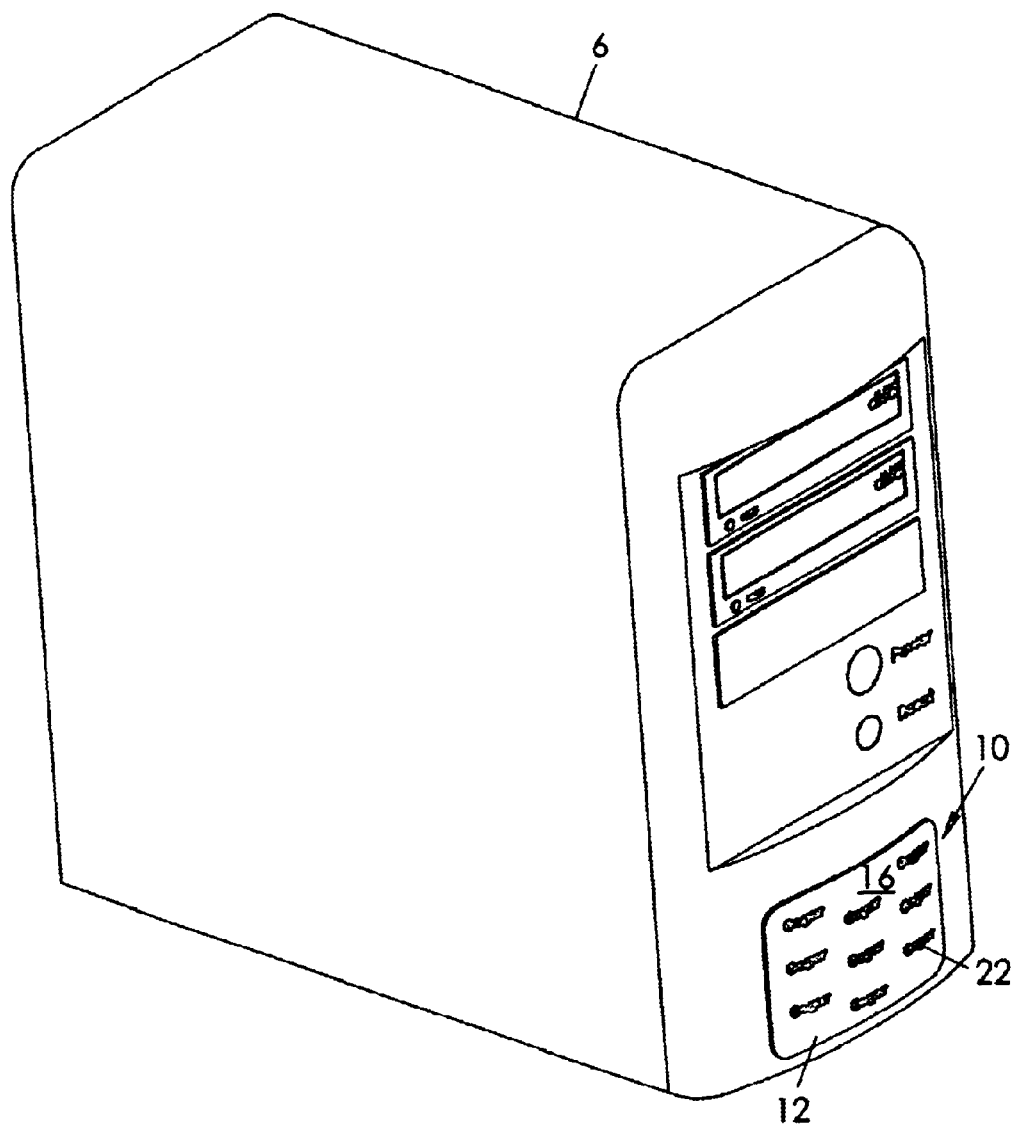
FIG. 1 is a perspective view of a filter apparatus according to a preferred embodiment of the present invention.
Figure 2:
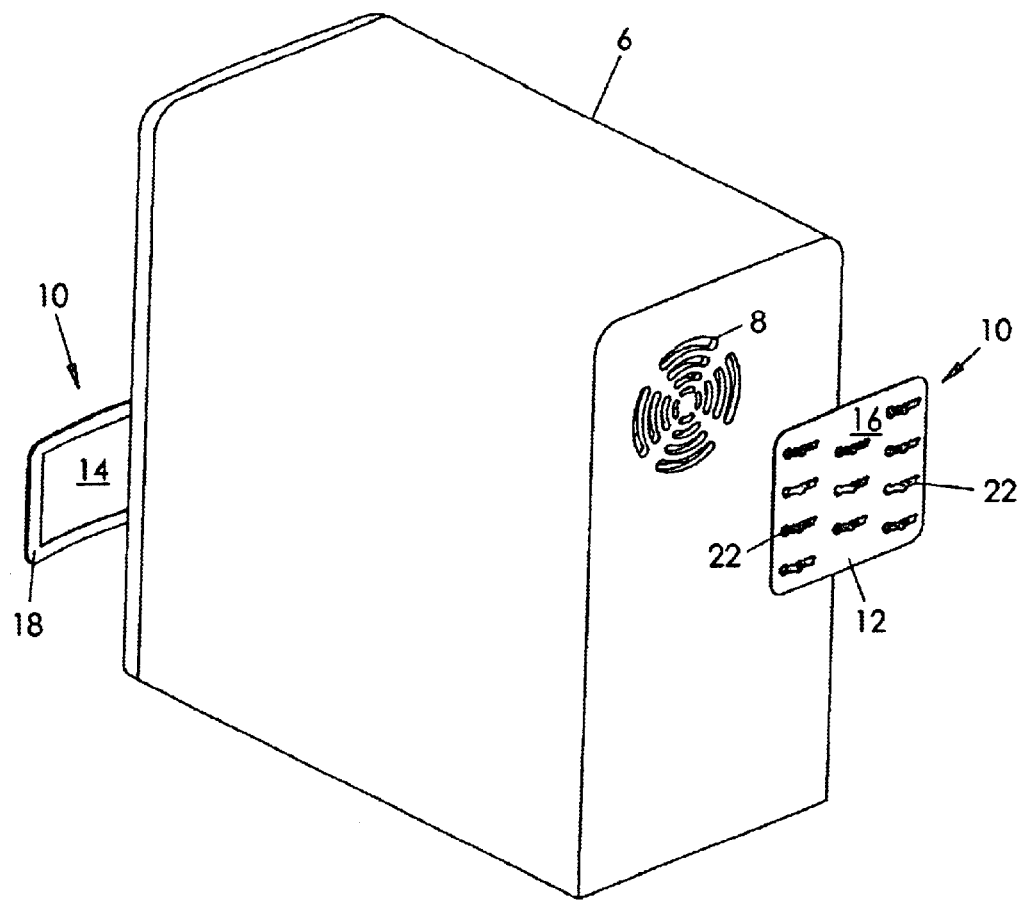
FIG. 2 is a perspective view of the filter apparatus as in FIG. 1 taken from another angle with a pair of apparatuses removed from a computer housing.
Figure 3:
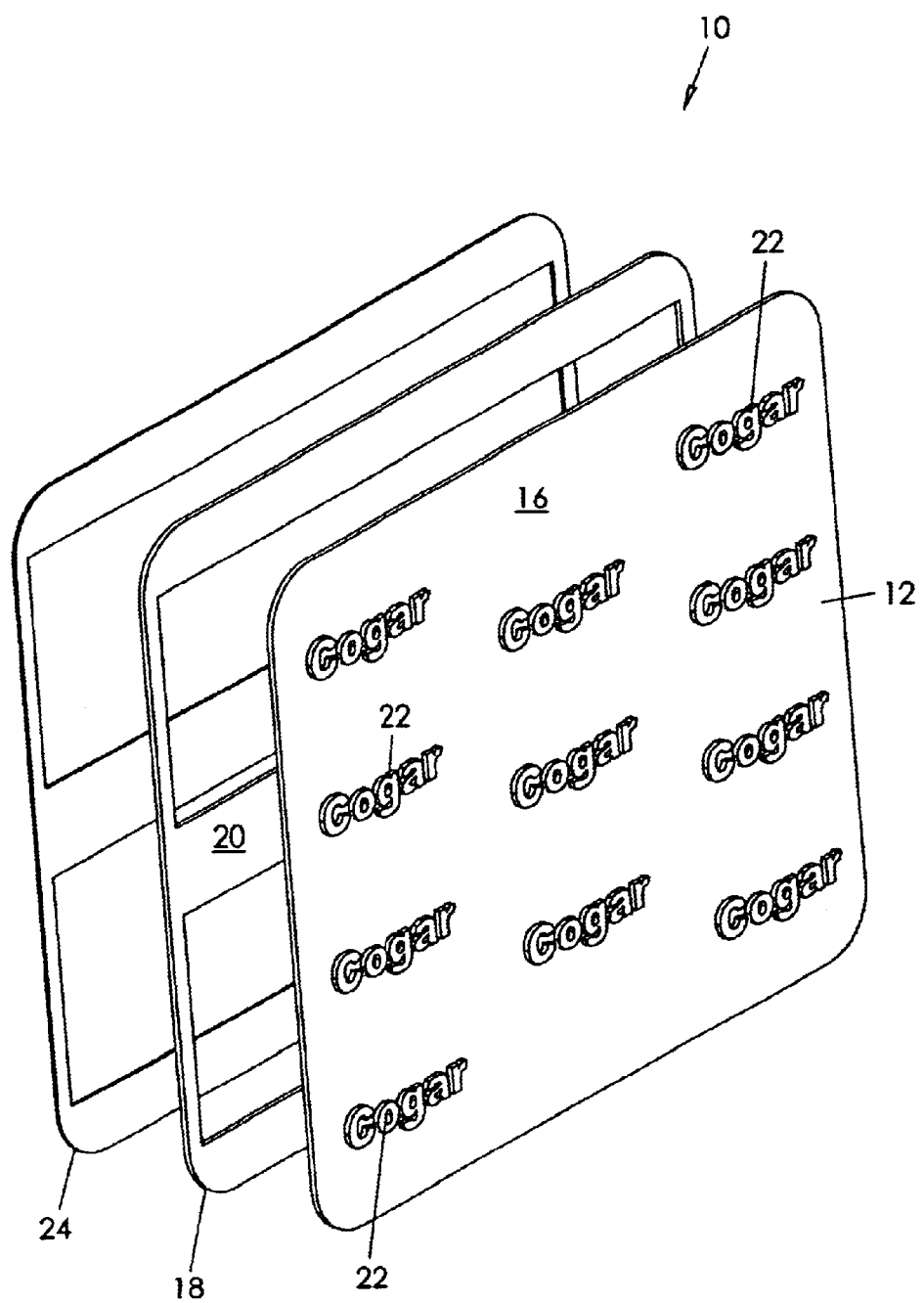
FIG. 3 is an exploded view of the filter apparatus as in FIG. 1.

A filter apparatus 10 according to a now preferred embodiment of the present invention will now be described in detail with reference to FIGS. 1 through 3 of the accompanying drawings. The filter apparatus 10 includes a configuration for completely covering an opening defined by a computer housing 6. This configuration may be circular or rectangular or any other configuration having a size that is slightly larger than a computer housing opening. In other words, one filter apparatus 10 may be used to cover an air intake opening (FIG. 1) and another filter apparatus 10 may be used to cover an outflow opening 8 (FIG. 2).

The filter apparatus 10 includes a filter panel 12 having inner 14 and outer 16 generally planar surfaces. Preferably, the filter panel 12 is a permanently charged electrostatic filter having a plurality of polyester fibers. Air movement across the filter panel generates an electrostatic charge that attracts dust to the fibers. Small dust particles need only a small electric charge to be attracted. It is understood that the level of charge generated by the electrostatic filter is below the level of electromagnetic interference that would disrupt computer signals or damage the computer. Further, the filter apparatus 10 is grounded when attached to the computer housing 6. Filter panels having other constructions may also be suitable for collecting dust.

The filter apparatus 10 further includes means for attaching the filter panel 12 to the computer housing 6 so as to completely cover a computer housing opening. More particularly, a layer of adhesive 18 is permanently adhered to the inner surface 14 of the filter panel 12 (FIG. 3). Since the adhesive layer 18 is utilized to adhere the filter panel 12 over a computer housing opening, the adhesive layer 18 is preferably positioned along a peripheral edge of the filter panel inner surface 14. In other words, the adhesive layer 18 is treated and positioned to removably adhere to an outer surface of the computer housing 6 along the peripheral edge of a computer housing opening. With this configuration, all air entering or exiting through a respective opening must pass through the filter panel 12 for purifying the air of dust or other particles. A support member 20 extends between opposed lateral portions of the adhesive layer 18 for stability and to inhibit the adhesive layer 18 from tearing upon removal from the computer housing 6. The use of a removable adhesive is also desirable such that the filter apparatus 10 may be removed and replaced as needed. While other attachment options are possible, such as hook and loop fasteners, spring clips, or a frame, a removable adhesive layer is preferred for the reasons described above.

It should be appreciated that the adhesive layer 18 may also include a thermal dependent adhesive. A thermal dependent adhesive includes a tackiness that is inversely proportional to temperature. In other words, the adherence of a thermal dependent adhesive layer to the computer housing 6 diminishes as the temperature of the housing increases. Thus, the filter apparatus 10 would fall off of the computer housing as an indicator that a temperature in the housing is increasing. Such an event provides a user with an indication that perhaps the filter apparatus 10 is no longer sufficiently capturing dust and needs to be replaced.

Further, the filter apparatus 10 includes a liner 24 having a configuration complementary to the configuration of the adhesive layer 18. The liner 24 is chemically treated so as to lightly adhere to the adhesive layer 18 for removal just before the filter panel 12 is adhered to the computer housing 6 via its adhesive layer 18. This liner 24 may be reapplied to the adhesive layer 18 if the filter apparatus 10 needs to be removed temporarily (but not completely replaced) such that the tackiness of the adhesive layer 18 may be maintained.

The outer surface 16 of the filter panel 12 includes a plurality of spaced apart thermochromic regions 22 (FIG. 3), although a single thermochromic region would be suitable. Each thermochromic region 22 may be in the form of alphanumeric or graphical indicia. Each thermochromic region 22 is able to change colors according to temperature changes between an ambient air temperature and an activation temperature. More particularly, each thermochromic region 22 includes an ink layer having a first color and being positioned on the outer surface 16 of the filter panel 12. Further, each thermochromic region 22 includes a leucodye having a wax layer positioned atop a respective ink layer and having a thermochromic dye therein. The thermochromic dye within the wax is characterized by a color that is different from the ink layer first color such that the first color is blocked by the color of the thermochromic dye at ambient temperature. However, the wax melts at a predetermined activation temperature such that the wax and thermochromic dye become a transparent ink. In this transparent state, the first color of the ink layer is no longer blocked and is visible to a user. Accordingly, each thermochromic region 22 changes color as temperature increases. It is understood that the use of a liquid crystal thermochromic construction as an alternative to a leucodye construction would also work.

The thermochromic dye utilized in each thermochromic region 22 may be either reversible or irreversible. More particularly, the process is reversible if the particular thermochromic dye used is of a type that solidifies when the wax and dye cool down after having been raised to the activation temperature. This enables the dye to regain its characteristic color that blocks the underlying ink layer. If the thermochromic dye is of a type that does not solidify upon cooling, then the process of color change is irreversible.

The filter apparatus 10 is suitable for use with a computer of a type having heat generating electronic components positioned within a housing 6. The computer housing 6 includes an air intake opening and an outflow opening 8, with air being circulated therebetween upon operation of a fan situated in the housing 6. In use, the liner 24 of a filter apparatus 10 may be removed from the adhesive layer 18 such that the adhesive layer 18 may be adhered to the outer surface of a computer housing 6. The filter apparatus 10 may be positioned to completely cover an air intake opening (FIG. 1 or outflow opening/vent 8 (FIG. 2). Accordingly, all air flowing through the computer housing upon operation of the computer's fan will flow through the filter panel 12 and be filtered. If, however, the filter panel 12 is full or clogged and the environment surrounding the electronics becomes dirty, the filter apparatus 10 is able to detect the corresponding temperature increase. As additional heat is generated within the computer housing 6 due to an accumulation of dust on the electronics, the thermochromic regions 22 change colors. This indicates to a user that the filter apparatus 10 should be replaced.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A filter apparatus for use on a computer of a type having heat generating electronics positioned in a housing with an air intake opening, the opening being positioned to receive air into said housing upon operation of a fan situated therein, said filter apparatus comprising:
   a filter panel having an inner surface and an outer surface, said filter panel having a configuration for completely covering said opening;
   a layer of adhesive permanently adhered to said inner surface of said filter panel along a peripheral edge thereof for removably adhering said filter panel to an outer surface of said housing at a position covering said opening, whereby all air received through said opening passes through said filter panel; and
   a thermochromic region positioned on said outer surface of said filter panel, said thermochromic region including an ink layer having a first color and a wax having a thermochromic dye therein positioned atop said ink layer, said thermochromic dye having a second color different from said first color at room temperature so as to block said first color, said wax and thermochromic dye changing to a transparent state at an activation temperature, whereby said first color is visible at said activation temperature.

2. The filter apparatus as in claim 1 further comprising a liner having a configuration complementary to a configuration of said layer of adhesive, said liner being treated so as to lightly adhere to said layer of adhesive for removal prior to adherence of said filter panel to said housing.

3. The filter apparatus as in claim 1 wherein said filter panel is a permanently charged electrostatic filter having a plurality of polyester fibers for generating an electric charge as air passes over said fibers, whereby to attract dust particles to said fibers.

4. The filter apparatus as in claim 1 wherein said ink layer and wax of said thermochromic region are in the form of alphanumeric or graphical indicia.

5. The filter apparatus as in claim 1 wherein said layer of adhesive includes a thermal adhesive characterized by a tackiness that is inversely proportional to temperature, whereby adherence of said layer of adhesive to said outer surface of said housing diminishes as the temperature of said outer surface increases.

6. The filter apparatus as in claim 1 wherein: said wax melts as the temperature increases such that said wax and said thermochromic dye become a transparent ink at said activation temperature.

7. The filter apparatus as in claim 6 wherein the change of said thermochromic dye from said second color to said transparent state is reversible.

8. The filter apparatus as in claim 6 wherein the change of said thermochromic dye from said second color to said transparent state is irreversible.

9. The filter apparatus as in claim 1 wherein the change of said thermochromic dye from said second color to said transparent state is irreversible.

10. A filter apparatus for use on a computer of a type having heat generating electronics positioned in a housing with an air intake opening, the opening being positioned to receive air into said housing upon operation of a fan situated therein, said filter apparatus comprising:

an electrostatic filter panel having an inner surface and an outer surface, said filter panel having a configuration for completely covering said opening, said filter having a plurality of permanently charged polyester fibers for generating an electric charge as air passes over said fibers, whereby to attract dust;

a layer of adhesive permanently adhered to said inner surface of said filter panel along a peripheral edge thereof for removably adhering said filter panel to an outer surface of said housing at a position covering said opening, whereby all air received through said opening passes through said filter panel; and a plurality of thermochromic regions spaced apart on said outer surface of said filter panel, each thermochromic region comprising:

an ink layer having a first color;

a leucodye having a wax layer with a thermochromic dye therein, said wax layer being positioned atop said ink layer, said thermochromic dye having a second color different from said first color at room temperature so as to block said first color, said wax layer and thermochromic dye becoming transparent at an activation temperature such that said first color is visible at said activation temperature.

11. The filter apparatus as in claim 10 further comprising a liner having a configuration complementary to a configuration of said layer of adhesive, said liner being treated so as to lightly adhere to said layer of adhesive for removal prior to adherence of said filter panel to said housing.

12. The filter apparatus as in claim 10 wherein said ink layer and wax of said thermochromic region are in the form of alphanumeric or graphical indicia.

13. The filter apparatus as in claim 10 wherein said layer of adhesive includes a thermal adhesive characterized by a tackiness that is inversely proportional to temperature, whereby adherence of said layer of adhesive to said outer surface of said housing diminishes as the temperature of said outer surface increases.

14. The filter apparatus as in claim 13 wherein the change of said thermochromic dye from said second color to said transparent state is reversible.

15. The filter apparatus as in claim 13 wherein the change of said thermochromic dye from said second color to said transparent state is irreversible.

16. The filter apparatus as in claim 13 wherein said ink layer and wax of said thermochromic region are in the form of alphanumeric or graphical indicia.

17. The filter apparatus as in claim 10 wherein the change of said thermochromic dye from said second color to said transparent state is reversible.

18. The filter apparatus as in claim 10 wherein the change of said thermochromic dye from said second color to said transparent state is irreversible.

* * * * *